United States Patent Office 3,492,130
Patented Jan. 27, 1970

3,492,130
HARD BUTTER COMPOSITIONS AND METHOD OF PRODUCTION
James Harwood, Chicago, Ill., assignor, by mesne assignments, to SCM Corporation, New York, N.Y., a corporation of New York
No Drawing. Filed Nov. 21, 1966, Ser. No. 595,598
Int. Cl. A23d 5/00
U.S. Cl. 99—118                                10 Claims

ABSTRACT OF THE DISCLOSURE

Compositions have been found which comprise mixtures of certain symmetrical and asymmetrical mono-unsaturated triglycerides and asymmetrical di-unsaturated triglycerides of domestic origin and which are temperable to a stable triple chain-length beta-crystalline form. The term "symmetrical glyceride" refers to positional isomer symmetry of the unsaturated acyl groups rather than the kind or type of saturated acyl groups present. For example, a product such as 2-oleo-3-palmito-1-stearin is a symmetrical though mixed glyceride. When tempered, the compositions are compatible with cocoa butter and can be used as extenders or substitutes therefor. Cocoa butter, a complex mixture of naturally occurring glycerides, is temperable to the stable triple chain-length, beta-crystalline form. However, domestic glycerides of plant and/or animal origin are generally not temperable to a stable triple chain-length beta-crystalline form but temper to a double chain-length or beta prime-crystalline form or a mixture of beta prime and beta-crystalline forms and when in such form are not compatible with cocoa butter.

---

The present invention relates to triglyceride compositions and to processes for preparing such compositions. The invention, more particularly, relates to domestic mono-unsaturated and di-unsaturated triglycerides which are temperable to a stable triple chain-length beta-crystalline form.

The invention is advantageous in that triglyceride products can be obtained which are compatible with cocoa butter.

The present invention provides a domestic triglyceride fat composition temperable to a stable triple chain-length beta-crystalline form, said composition consisting essentially of the co-crystallization product of an intimate mixture of from about 60 to about 95 weight percent of at least one triglyceride of the formula:

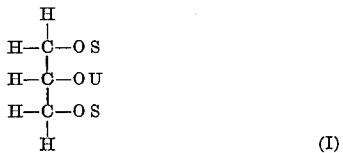

and from about 40 to about 5 weight percent of substantially equimolecular proportions of triglycerides of the formulae:

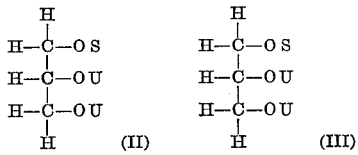

where, in the above Formulae I, II and III, S is a saturated acyl radical and U is an unsaturated aliphatic acyl group and where S and U contain between 16 and 18 carbon atoms.

Compositions falling within the scope of the above-described formulation are characterized in having a melting point range and iodine value similar to the melting point range and iodine value of cocoa butter. More importantly, the compositions are temperable to a stable beta-crystalline form.

The term "mono-unsaturated triglycerides" as used herein is intended to means and to refer to triglycerides in which one of the acyl groups or radicals contains carbon-carbon unsaturation. The term "di-unsaturated triglycerides" as used herein is intended to mean and to refer to triglycerides in which two of the acyl groups have carbon-carbon unsaturation.

The term "beta-crystalline form" as used herein is intended to mean and to refer to that crystalline form of domestic triglycerides (and cocoa butter), which is the most stable thermodynamically, wherein a preponderance of the molecules are usually packed in a dense triple chain-length crystalline lattice. The "beta-crystalline form" is differentiated from the beta prime-crystalline form wherein triglyceride molecules are packed in a less dense crystal lattice and usually in double chain-lengths.

In the above formulae, S and U represent acyl groups or radicals, preferably aliphatic acyl groups or radicals containing from 16 to 18 carbon atoms. If the glycerides in compositions contain significant quantities of acyl groups having less than 16 carbon atoms, the melting point of the compositions will be undesirably low. On the other hand, if the glycerides in the compositions contain significant quantities of acyl groups having more than 18 carbon atoms, the melting point of the compositions will be undesirably high.

Compositions having melting points which are substantially higher or lower than the melting point of cocoa butter (e.g. melting points outside the range of about 30 to 37° C.) will usually not be compatible therewith, particularly when it is intended to use resulting products in confections, such as, for example, enrobing agents for candies.

Specific mono-unsaturated triglycerides falling within the scope of Formula I which can be employed in the compositions of this invention include: 2-oleo-1,3-dipalmitin; 2-oleo-1,3-distearin; 2-oleo-1,3-dimargarin; 2-oleo-3-palmito-1-stearin; 2-oleo-3-palmito-1-margarin; 2-oleo-3-margaro-1-stearin; 2-palmitoleo-1,3-dipalmitin; 2-palmitoleo-1,3-distearin; 2-palmitoleo-1,3-dimargarin; 2-palmitoleo-3-palmito-1-stearin; 2-palmitoleo-3-palmito-1-margarin; 2-palmitoleo-3-margaro-1-stearin. Mixtures of two or more of the foregoing triglycerides can also be suitably employed in the compositions in this invention.

Specific di-unsaturated triglycerides falling within the scope of Formula II which can be employed in the compositions of this invention include: 1-stearo-2,3-diolein; 1-palmito-2,3-diolein, 3-oleo-2-palmitoleo - 1 - stearin; 2-oleo-3-palmitoleo-1-stearin; 1-palmito-2-palmitoleo-3-olein; 2-oleo-3-palmitoleo-1-palmitin. Mixtures of two or more of the foregoing triglycerides can also be suitably employed in the compositions of the invention.

Specific mono-unsaturated triglycerides falling within the scope of Formula III which can be employed in the compositions of this invention include: 3-oleo-1,2-distearin; 3-oleo-1,2-dipalmitin; 3-oleo-1,2-dimargarin; 3-oleo-2-palmito-1-stearin; 3-oleo-2-palmito-1-margarin; 1-oleo-3-palmito - 2-stearin; 1-oleo-3-margaro-2-stearin; 3-oleo-2-margaro-1-stearin; 3-oleo-2-margaro-1-palmitin; 3-palmitoleo-1,2-distearin; 3-palmitoleo-1,2-dipalmitin; 3-palmitoleo-1,2-dimargarin; 3-palmitoleo-2-palmito-1-stearin; 3-palmitoleo-2-palmito-1-margarin; 3-palmitoleo-1-palmito-2-stearin; 3-palmitoleo-1-margaro-2-stearin; 3-palmitoleo-2-margaro-1-stearin; 3-palmitoleo-2-margaro-1 - palmitin. Mixtures of two or more of the foregoing triglycerides can also be suitably employed in the compositions of this invention.

In the above formulae, S is aliphatic acyl and preferably is stearoyl, palmitoyl or isomers or mixtures of these, U represents an unsaturated acyl group, preferably a mono-unsaturated group such as oleoyl or palmitoleoyl.

Compositions falling within the scope of this invention, when freshly obtained form a melt, are in the alpha form but soon transform to the beta prime-crystalline form; however, the compositions undergo transformation to the beta-crystalline form upon heating at temperatures between 30 and 33° C. for short periods of time (e.g. from 1 to 3 days).

Fats of natural origin consisting preponderantly of partially unsaturated triglycerides and having acyl groups containing from 16 to 18 carbon atoms, when solidified (e.g. crystallized) from a melt, are almost always in the alpha or beta prime-crystalline form. Upon heating these crystallized triglycerides at relatively low temperatures, e.g. 30–33° C. (a process sometimes hereinafter referred to as tempering), a significant portion or all of the triglyceride fat remains in the beta prime-crystalline form. Such tempered glyceride fats are incompatible with cocoa butter which is a highly complex glyceride mixture and which is known to be temperable to the beta-crystalline form.

The tempering properties of the novel compositions of this invention are unexpected. When the di-unsaturated triglyceride component is omitted from the compositions of this invention a product which is temperable to the beta-crystalline form cannot be obtained. Also, when the asymmetric mono-unsaturated triglyceride component is omitted the resultant composition is not temperable to the beta-crystalline form. Surprisingly, when small quantities of a totally saturated triglyceride component, such as that contained in cocoa butter, are added to the above compositions the resultant compositions are not temperable to the beta-crystalline form.

The triglyceride compositions of the present invention are prepared by a process which comprises the steps of:

(1) forming a co-crystallizable mixture comprising from about 70 to about 90 weight percent of a triglyceride of the formula:

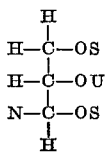

and from about 30 to about 10 weight percent of substantially equimolecular proportions of triglycerides of the formulae:

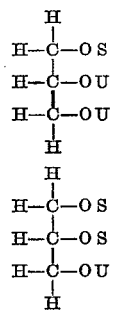

where S represents a saturated acyl radical, U represents an unsaturated aliphatic acyl radical and where S and U contain between 16 and 18 carbon atoms;

(2) co-crystallizing said mixture thereby forming a crystalline mass consisting substantially of said triglycerides in mixed crystalline form;

(3) tempering said mass for a time sufficient to form a stable triglyceride product in beta-crystalline form.

By so proceeding, a stable product is obtained which can be employed as an extender in, or substitute for, cocoa butter. The co-crystallizable mixture in the above-described process may be formed by intimately admixing solid particles of the various triglycerides in amounts within the ranges above-described. Such mixing can be accomplished either by dispersion or solution of the triglycerides in a suitable organic liquid or solvent or by mechanical mixing of solid particles. When dispersed or dissolved in a solvent, the glycerides can be co-crystallized by removal of at least a portion of the solvent or liquid, by cooling the solvent or liquid, or both. Co-crystallization can also be accomplished by melting and cooling the mechanical mixture and this method has been found preferable for economic reasons. The co-crystallized mass is thereafter placed in a tempering oven (e.g. in an oven maintained between about 30–32° C. for from about 12 to 72 hours). The co-crystallized mass, as formed from a melt, comprises a mixture of crystals which are in mixed beta prime and beta-crystalline forms.

The following specific examples are intended to illustrate the invention but not to limit the scope thereof, parts and percentages being by weight unless otherwise specified.

EXAMPLE 1

The preparation of 1,3-dipalmitin

A mixture consisting of 650 grams of tripalmitin and 37 grams of glycerol was heated at 120° C. with stirring for 2 hours under a stream of dry nitrogen. The mixture was then cooled to 85° C. and to it there was added 3 grams of sodium methoxide. Stirring was then continued for 4 hours during which time the mixture was maintained at 85–90° C. The resultant product was cooled to about 80° C. and 100 ml. of tetrahydrofuran was added to the mixture.

The resultant mixture was then cooled to about 60° C. and a slow stream of nitrogen was passed over the mixture in order to remove the solvent. During this period the temperature dropped slowly. When the temperature reached 53.8° C., crystals began to appear in the mixture and the temperature rose to 56° C. over a period of an hour. The temperature was maintained at 56–57° C. for several hours during which time stirring was continued. The mixture was stirred overnight and the temperature had fallen to 23.5° C. by the next morning. Stirring was continued until the reaction mass had completely solidified or had become too viscous for the stirrer to function. The resultant product was analyzed by thin layer chromatography and was shown to consist preponderantly of 1,3-dipalmitin.

Two hundred fifty (250) grams of the crude 1,3-dipalmitin product so obtained was dissolved in n-hexane (Skellysolve B) to which acetic acid had been added (to inactivate the sodium methoxide catalyst present therein). The solution was cooled and 1,3-dipalmitin crystals were recovered. The crystallization procedure was repeated and 160 grams of 1,3-dipalmitin having a melting point of 71.4–72.2° C. was obtained.

EXAMPLE 2

The preparation of 2-oleo-1,3-dipalmitin

A 57 gram portion of the 1,3-dipalmitin obtained from Example 1 was suspended in a liquid consisting of 150 ml. n-hexane (Skellysolve B) plus 20 ml. of pyridine. The resulting suspension was agitated at 25° C. (e.g. room temperature) during which time 34.9 grams of oleoyl chloride was added dropwise to the suspension. After 24 hours stirring, 2-oleo-1,3-dipalmitin was obtained.

EXAMPLE 3

The preparation of 2-oleo-3-palmito-1-stearin

The procedure of Example 2 was repeated except that 3-palmito-1-stearin was employed in place of the 1,3-dipalmitin employed in Example 3. The resulting product, upon recrystallization from the solvent, consisted of 2-oleo-3-palmito-1-stearin and the crystals were in the beta-crystalline form.

Samples of the melted and solidified glycerides were placed in a 1 x 2 centimeter X-ray sample holder and their crystalline properties determined by X-ray diffraction analysis. The samples were then placed in a tempering oven which was maintained at a temperature between 31–32° C. and through which a flow of gaseous nitrogen was maintained. The samples were removed from the tempering oven at 24 hours intervals and subjected to X-ray diffraction analysis. The results of these analyses are given in Table II.

TABLE II

| Composition No.: | Untempered from melt | Crystalline Form, Tempering Time, Days | | | | | |
|---|---|---|---|---|---|---|---|
| | | 1 | 2 | 3 | 4 | 5 | 9 |
| 1 | $\beta'$ plus $\beta$ | $\beta'$ plus $\beta$ | $\beta'$ plus $\beta$ | $\beta'$ plus $\beta$ | $\beta'$ plus $\beta$ | $\beta'$ plus $\beta$ | $\beta'$ plus $\beta$ |
| 2 | $\beta'$ plus $\beta$ | $\beta'$ plus $\beta$ | $\beta'$ plus $\beta$ | $\beta'$ plus $\beta$ | $\beta'$ plus $\beta$ | $\beta'$ plus $\beta$ | $\beta'$ plus $\beta$ |
| 3 | $\beta'$ plus $\beta$ | $\beta'$ plus $\beta$ | $\beta'$ plus $\beta$ | $\beta'$ plus $\beta$ | $\beta'$ plus $\beta$ | $\beta'$ plus $\beta$ | $\beta'$ plus $\beta$ |
| 4 | $\beta'$ plus $\beta$ | $\beta'$ plus $\beta$ | $\beta'$ plus $\beta$ | $\beta'$ plus $\beta$ | $\beta'$ plus $\beta$ | $\beta'$ plus $\beta$ | $\beta'$ plus $\beta$ |
| 5 | $\beta'$ | $\beta'$ plus $\beta$ | $\beta$ | $\beta$ | $\beta$ | $\beta$ | $\beta$ |
| 6 | $\beta'$ | $\beta'$ plus $\beta$ | $\beta$ | $\beta$ | $\beta$ | $\beta$ | $\beta$ |
| 7 | $\beta'$ | $\beta'$ plus $\beta$ | $\beta'$ plus $\beta$ | $\beta'$ plus $\beta$ | $\beta'$ plus $\beta$ | $\beta'$ plus $\beta$ | $\beta'$ plus $\beta$. |
| 8 | $\beta'$ | $\beta'$ plus $\beta$ | $\beta'$ plus $\beta$ | $\beta'$ plus $\beta$ | $\beta'$ plus $\beta$ | $\beta'$ plus $\beta$ | $\beta'$ plus $\beta$. |

EXAMPLE 4

The preparation of 3-palmito-1,2-diolein

The procedure of Example 2 was repeated except that 33 grams of 1-mono-palmitin were employed in place of the 1,3-dipalmitin employed in that example and 77 grams of oleoyl chloride were used. The resulting purified product was a liquid oily material which could not be crystallized.

EXAMPLE 5

The preparation of 3-oleo-1,2-dipalmitin

The procedure of Example 3 was repeated except that 1,2-dipalmitin was employed in place of the 1,3-dipalmitin used in that example. Thirty-eight and five-tenths (38.5) grams of a crystalline product in the beta form was obtained.

EXAMPLE 6

The preparation of 3-stearo-1,2-diolein

The procedure of Example 4 was repeated except that 1-monostearin was employed in place of the monopalmitin employed in that example. The resulting product consisted of 3-stearo-1,2-diolein, was liquid and could not be crystallized at room temperature.

EXAMPLE 7

Preparation of 3-oleo-1,2-distearin

The procedure of Example 5 was repeated except that 1,2-distearin was used in place of the 1,2-dipalmitin employed in that example. About 35 grams of crystalline 3-oleo-1,2-distearin in the beta form was obtained from the solvent.

EXAMPLE 8

Synthetic triglyceride compositions

Eight compositions containing the ingredients in the amounts listed in Table I were prepared by melting and mixing the ingredients and thereafter solidifying them by cooling.

As can be seen in Table II, Compositions 5 and 6, when mixed and melted, co-crystallized to the beta prime form, that is, the crystals were composed of lattices of double chain-length. Surprisingly, upon tempering for 48 hours, the crystals were transformed from the beta prime to the beta form (e.g. to crystals composed of lattices of triple chain-length). Compositions 7 and 8 which more closely resembled cocoa butter in that they contained small quantities of tri-saturated triglycerides were not temperable to the beta-crystalline form even after tempering for 9 days. As is evident in Table II, glycerides obtained from a melt are usually either in the beta prime-crystalline form or are mixtures of beta prime and beta-crystalline forms. Such triglycerides, upon tempering, almost always remain in the mixed crystalline forms or if solely in the beta prime-crystalline form convert to mixtures of beta prime and beta-crystalline forms. Compositions containing symmetrical mono-unsaturated di-saturated triglycerides and smaller quantities of asymmetrical mono-unsaturated di-saturated triglycerides and di-unsaturated mono-saturated glycerides are surprisingly temperable from the beta prime-crystalline form to mixtures of beta prime and beta-crystalline forms and, from these mixed crystalline forms, are temperable to the beta-crystalline form.

What is claimed is:

1. A hard butter triglyceride composition, temperable to a stable beta-crystalline form, consisting essentially of the co-crystallization product of mixture comprising:

(1) from about 70 to about 95 weight percent of a triglyceride of the formula:

$$\begin{array}{c} \mathrm{H} \\ | \\ \mathrm{H-C-OS} \\ | \\ \mathrm{H-C-OU} \\ | \\ \mathrm{H-C-OS} \\ | \\ \mathrm{H} \end{array}$$

and (2) from about 30 to about 5 weight percent of sub-

TABLE I

| Ingredient | Composition Number | | | | | | | |
|---|---|---|---|---|---|---|---|---|
| | 1, percent | 2, percent | 3, percent | 4, percent | 5, percent | 6, percent | 7, percent | 8, percent |
| 2-oleo-1,3-dipalmitin | 100 | | 94.98 | | 90.32 | 91.32 | 85.98 | 81.54 |
| 2-oleo-3-palmitostearin | | 100 | | 94.95 | | | | |
| 1-palmito-2,3-diolein | | | | | 4.92 | | 4.67 | 9.5 |
| 3-oleo-1,2-dipalmitin | | | 5.02 | | 4.76 | | 4.53 | 4.30 |
| 3-stearo-1,2-diolein | | | | | | 4.42 | | |
| 3-oleo-1,2-distearin | | | | 5.05 | | 4.26 | | |
| Tripalmitin | | | | | | | 4.82 | |
| Tristearin | | | | | | | | 4.57 | stantially equimolecular proportions of triglycerides of the formulae:

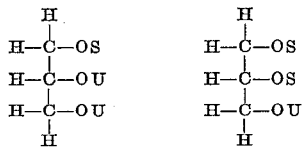

where, in the above formulae, S is a saturated aliphatic acyl radical and U is oleoyl or palmitoleoyl radical and wherein S and U contain between 16 and 18 carbon atoms.

2. The composition of claim 1 wherein U in said formulae is oleoyl.

3. The composition of claim 1 wherein S in said formulae is a saturated acyl group selected from the class consisting of stearoyl, palmitoyl and mixtures thereof.

4. The composition of claim 3 wherein S in said formulae is stearoyl.

5. The composition of claim 3 wherein S in said formulae is palmitoyl.

6. The composition of claim 3 wherein S in said formulae is mixed stearoyl and palmitoyl.

7. A process for preparing a triglyceride composition temperable to a stable beta-crystalline form which comprises the steps of:
   (1) forming a co-crystallizable mixture comprising from about 70 to about 95 weight percent of a triglyceride of the formula:

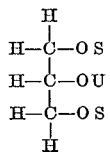

and from about 30 to about 5 weight percent of substantially equimolecular proportions of triglycerides of the formulae:

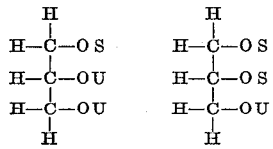

where S represents a saturated acyl radical, U represents an unsaturated aliphatic acyl radical and where S and U contain between 16 and 18 carbon atoms;
   (2) co-crystallizing said mixture thereby forming a crystalline mass consisting substantially of said triglycerides in beta prime-crystalline form; and
   (3) tempering said mass for a time sufficient to form a stable triglyceride product in beta-crystalline form.

8. The process of claim 7 wherein said co-crystallizable mixture is co-crystallized by melting said mixture.

9. The process of claim 7 wherein said mass is tempered at from between about 30 to 33° C. in an inert atmosphere.

10. The process as in claim 9 wherein the inert atmosphere is nitrogen.

References Cited

Feuge et al., Journal of American Oil Chemists' Society, May 1958, vol. 35 No. 5, pp. 194–199.

Spudaro et al., Journal of American Oil Chemists' Society, September 1961, vol. 38, No. 9, pp. 461–465.

Landmann et al., Journal of American Oil Chemists' Society, December 1961, vol. 38, No. 12, pp. 681–685.

MAURICE W. GREENSTEIN, Primary Examiner

U.S. Cl. X.R.
99—23; 260—410.7